(12) United States Patent
Ishino et al.

(10) Patent No.: US 12,115,920 B2
(45) Date of Patent: Oct. 15, 2024

(54) WORK VEHICLE

(71) Applicant: Yanmar Holdings Co., Ltd., Osaka (JP)

(72) Inventors: Tatsuya Ishino, Okayama (JP); Yohei Nakagawa, Okayama (JP)

(73) Assignee: YANMAR HOLDINGS CO., LTD., Osaka (JP)

( * ) Notice: Subject to any disclaimer, the term of this patent is extended or adjusted under 35 U.S.C. 154(b) by 224 days.

(21) Appl. No.: 17/903,385

(22) Filed: Sep. 6, 2022

(65) Prior Publication Data

US 2023/0077096 A1 Mar. 9, 2023

(30) Foreign Application Priority Data

Sep. 6, 2021 (JP) .................. 2021-144660

(51) Int. Cl.
*B60R 21/13* (2006.01)
*B60R 11/00* (2006.01)
*B60R 11/02* (2006.01)

(52) U.S. Cl.
CPC ........ *B60R 11/0258* (2013.01); *B60R 21/131* (2013.01); *B60R 2011/004* (2013.01); *B60Y 2200/221* (2013.01)

(58) Field of Classification Search
CPC . B60R 11/00; B60R 21/31; B60R 2011/0066; B62D 49/06; A01B 76/00; H01Q 1/325
See application file for complete search history.

(56) References Cited

U.S. PATENT DOCUMENTS

| | | | |
|---|---|---|---|
| 11,529,920 B2* | 12/2022 | Misaki | B60R 11/02 |
| 11,760,293 B2* | 9/2023 | Kobayashi | H01Q 1/12 |
| | | | 180/400 |
| 11,912,205 B2* | 2/2024 | Takase | A01B 69/008 |
| 11,951,910 B2* | 4/2024 | Misaki | H01Q 1/3275 |
| 2022/0105875 A1* | 4/2022 | Misaki | B60R 11/02 |
| 2023/0076382 A1* | 3/2023 | Ishino | B60R 11/00 |
| 2023/0077096 A1* | 3/2023 | Ishino | G05D 1/0011 |

FOREIGN PATENT DOCUMENTS

| | | |
|---|---|---|
| JP | 2021041745 A | 3/2021 |
| WO | 2020129969 A1 | 6/2020 |

OTHER PUBLICATIONS

European Search Report dated Jan. 25, 2023 issued in EP Application 22192797.3.

* cited by examiner

*Primary Examiner* — Faye M Fleming
(74) *Attorney, Agent, or Firm* — NORTON ROSE FULBRIGHT US LLP

(57) ABSTRACT

A work vehicle includes a vehicle body, a positioning unit that detects a position of the vehicle body based on a signal sent from a positioning satellite, a support configuration portion installed on the vehicle body, an installing stay to which the positioning unit is fixed, and a base stay fixed to the support configuration portion. One of the installing stay and the base stay has a protruding piece portion. Another of the installing stay and the base stay has a hole portion into and with which the protruding piece portion is inserted and engaged.

12 Claims, 13 Drawing Sheets

WORK VEHICLE

CROSS-REFERENCE TO RELATED APPLICATIONS

This application is claims priority under 35 U.S.C. § 119 to JP Application No. 2021-144660 filed Sep. 6, 2021, the entire contents of which are hereby incorporated by reference.

TECHNICAL FIELD

The present invention relates to a work vehicle such as tractor.

BACKGROUND ART

Conventionally, there has been proposed a technology where a positioning unit, which detects a position of a vehicle body, is provided above a cabin of a tractor. For example, Patent Document 1 discloses a technology in which an installing stay with a positioning unit installed thereto is fixed, by a bolt, to a base stay provided on the vehicle body side.

PRIOR ART DOCUMENT

Patent Document

Patent Document 1: Japanese Unexamined Patent Application Publication No. 2021-041745

SUMMARY OF INVENTION

Technical Problem

In the configuration of the Patent Document 1, it is necessary to use a tool to loosen and tighten the bolts when attaching and detaching the positioning unit to and from the vehicle body. This made the detachment and reattachment of the positioning unit cumbersome, and there was room for improvement.

The present invention has been made to solve the problem, an object of which is to provide a work vehicle to and from which a positioning unit can be easily attached and detached without the use of a tool (non-tool).

Solution to Problem

A work vehicle according to an aspect of the present invention is provided with a vehicle body and a positioning unit that detects a position of the vehicle body based on a signal sent from a positioning satellite, the work vehicle including; a support configuration portion installed on the vehicle body; an installing stay to which the positioning unit is fixed; and a base stay fixed to the support configuration portion, wherein one of the installing stay and the base stay has a protruding piece portion, and another of the installing stay and the base stay has a hole portion into and with which the protruding piece portion is inserted and engaged.

Advantageous Effects of Invention

According to the configuration, the positioning unit can be easily attached and detached to and from the work vehicle without the use of a tool (non-tool).

DESCRIPTION OF EMBODIMENTS

Figure 1:
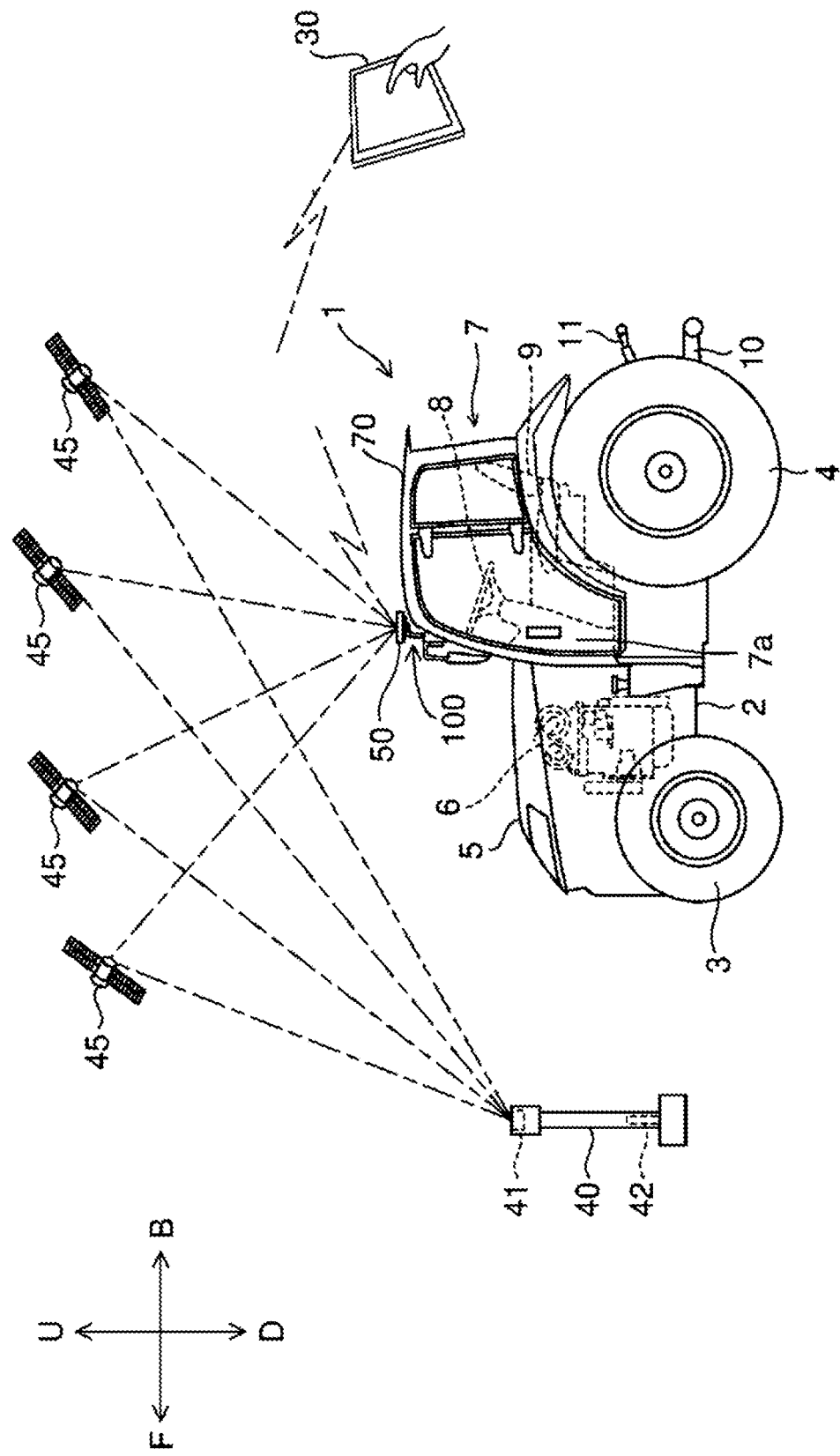
FIG. 1 is a schematic side view of a configuration of a tractor which is an example of a work vehicle according to an embodiment of the present invention.

The following is a description of an embodiment of the present invention based on the drawings. In the present embodiment, a tractor will be described as an example of a work vehicle. In addition to the tractor, examples of the work vehicle include riding work vehicles such as a rice transplanter, a combine harvester, a civil engineering and construction work device, and a snowplow.

In this description, directions are defined as follows. First, the direction in which the tractor as the work vehicle proceeds during work is defined as "front" and the opposite direction is defined as "back". The right side toward the proceeding direction of the tractor is defined as right, and the left side is defined as left. The direction perpendicular to the front-back and left-right directions of the tractor is defined as a vertical direction. In this case, the direction of gravity is downward and the opposite side is upward. In the drawings, the front direction is indicated by F, the back direction by B, the left direction by L, the right direction by R, the upward direction by U, and the downward direction by D.

[1. Overview of Vehicle Travel System]

Figure 2:
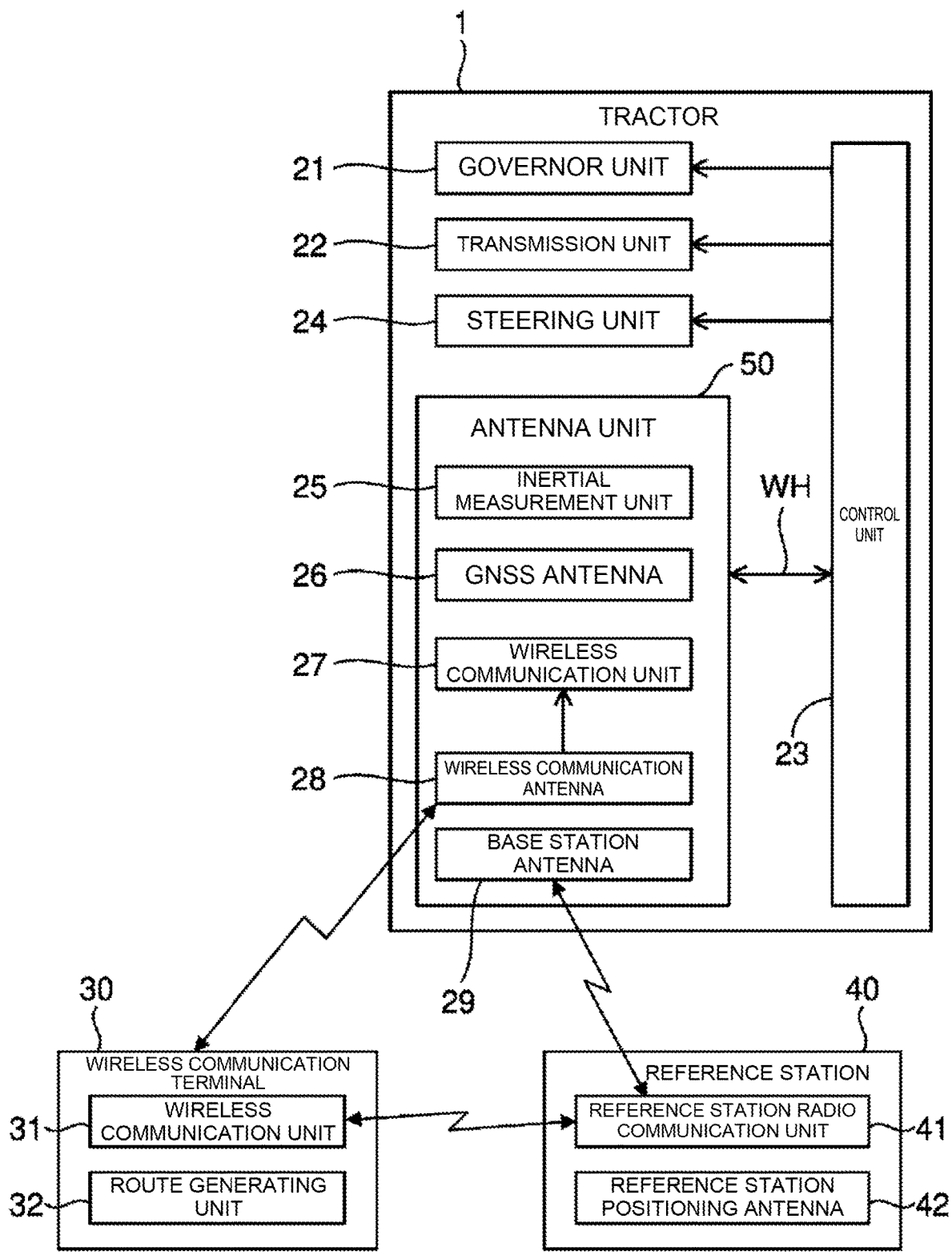
FIG. 2 is a block diagram of a vehicle travel system including the tractor.

FIG. 1 is a schematic side view of a tractor 1 which is an example of a work vehicle of the present embodiment. FIG. 2 is a block diagram of a vehicle travel system including the tractor 1.

As shown in FIG. 2, the vehicle travel system is composed of the tractor 1, a wireless communication terminal 30, and a reference station 40. The tractor 1 can travel according to the operation of the driver or can travel autonomously based on an instruction or the like from the wireless communication terminal 30. The wireless communication terminal 30 is a terminal for giving various instructions, etc. to the tractor 1. The reference station 40 is provided so as to obtain position information of the tractor 1.

As shown in FIG. 1, the tractor 1 includes a vehicle body 2. A ground work machine (not illustrated) can be mounted to a rear side of the vehicle body 2. The ground work machine can be, for example, but is not limited to, cultivators, plows, and fertilizer application instrument.

The front portion of the vehicle body 2 is supported by a pair of left-right front wheels 3. The back portion of the vehicle body 2 is supported by a pair of left-right back wheels 4. In the front portion of the vehicle body 2, a hood 5 is located. An engine 6 as a drive source is located below the hood 5. The engine 6 is composed of a diesel engine, for example, but is not limited to this and may be composed of a gasoline engine, for example. In addition to or instead of the engine 6, an electric motor may be used as the drive source.

A cabin 7 which a manipulator (the driver) gets in is provided in an upper portion of the vehicle body 2 behind the hood 5. A door 7a that rotates and opens to the front is provided on a left side of the cabin 7. The driver can get in and out of the cabin 7 by opening and closing the door 7a. The door 7a may be provided on a right side of the cabin 7.

In the cabin 7, a steering wheel 8 for the driver to perform a steering operation and a driver's seat 9 for the driver are provided. The cabin 7 has a front windshield FG in front of the driver's seat 9 (see FIG. 3 and FIG. 4). The front windshield FG and the door 7a may be omitted from the configuration.

A three-point link mechanism is provided on the back side of the vehicle body 2. The three-point link mechanism is composed of a pair of left-right lower links 10 and an upper link 11. The ground work machine is configured to be attachable to the three-point linkage mechanism. A raising-lowering device (not shown) with a hydraulic system such as a lifting cylinder is provided at the back side of the vehicle body 2. The raising-lowering device raises and lowers the three-point link mechanism, thereby making it possible to raise and lower the ground work machine.

As shown in FIG. 2, tractor 1 is provided with a governor unit 21 that can adjust the rotational speed of engine 6 and a transmission unit 22 that changes the speed and transmits the rotational drive power from the engine 6 to the drive wheels. The governor unit 21 and transmission unit 22 are controlled by a control unit 23.

The tractor 1 is equipped with a steering unit 24. The steering unit 24 is provided, for example, at the midpoint of the rotational axis of the steering wheel 8 and is configured to adjust the rotational angle (steering angle) of the steering wheel 8. By the control unit 23 controlling the steering unit 24, the tractor 1 can not only drive straight ahead, but also turn the steering wheel 8 at a desired angle, and can make a turn at a desired turning radius.

The tractor 1 is further equipped with an antenna unit 50. The antenna unit 50 is a positioning unit that detects the position of vehicle body 2 based on a signal sent from a positioning satellite (navigation satellite) 45 shown in FIG. 1.

The antenna unit 50 and the control unit 23 are electrically connected by a harness WH. This can send various information or instructions between the antenna unit 50 and the control unit 23 via the harness WH. For example, the vehicle body 2's position information detected by the antenna unit 50 is input to the control unit 23 via the harness WH.

Next, a detailed description will be made on the antenna unit 50 described above. The antenna unit 50 has an inertial measurement unit (IMU) 25, a GNSS (Global Navigation Satellite System) antenna 26, a wireless communication unit 27, a wireless communication antenna 28, and a base station antenna 29.

The inertial measurement unit 25 is equipped with a 3-axis gyro sensor and a 3-way accelerometer, which detects angular velocity and acceleration in three dimensions. The detected value of the inertial measurement unit 25 is input to the control unit 23. The control unit 23 can obtain the attitude information of the tractor 1 based on the above detected value. The above attitude information includes, for example, the azimuth angle of a machine body (yaw angle), the left-right tilt angle of the machine body (roll angle), and the front-back tilt angle in the direction where the machine body is proceeding (pitch angle).

The GNSS antenna 26 receives radio signals sent from a positioning satellite 45 that forms a satellite positioning system (GNSS). In the satellite positioning system, in addition to GPS (Global Positioning System; U.S.), Quasi-Zenith Satellite System (Japan), GLONASS satellite (Russia) or the like can be used as positioning satellites.

The wireless communication unit 27 sends and receives various signals via a wireless communication network formed in combination with the wireless communication terminal 30 and other devices. In the present embodiment, the wireless communication unit 27 is a Wifi (registered trademark) unit with a frequency band of 2.4 GHz. Signals sent from the wireless communication terminal 30 are received by the wireless communication antenna 28 and, and are input to the control unit 23 via the wireless communication unit 27. In addition, signals from the control unit 23 are sent via the wireless communication unit 27 and the wireless communication antenna 28 to a wireless communication unit 31, etc. of the wireless communication terminal 30.

Here, for example, RTK (Real Time Kinematic) positioning is used in the present embodiment, as a positioning method using the satellite positioning system. In the RTK positioning, the carrier phase (satellite positioning information) from the positioning satellites 45 is measured by both of a reference station positioning antenna 42 of the reference station 40 installed at the reference point, and the GNSS antenna 26 of the tractor 1 that is on the mobile station side of the target for which the position information is sought. At the reference station 40, correction information is generated each time the satellite positioning information is measured from the positioning satellite 45, or each time a set period elapses. The above correction information is sent from a reference station radio communication unit 41 to the base station antenna 29 of the tractor 1. Using the correction information sent from the reference station 40, the control unit 23 of the tractor 1 corrects the satellite positioning information measured by the GNSS antenna 26, thereby to seek the current position information of the tractor 1. The control unit 23 seeks, for example, latitude information and longitude information as the current position information of the tractor 1.

The positioning method used is not limited to the RTK positioning described above, and other positioning methods such as DGPS (differential GPS positioning) may also be used. Further, the reference station 40 can send and receive various information not only to and from the tractor 1, but also to and from the wireless communication terminal 30.

The wireless communication terminal 30 is composed of, for example, a tablet type personal computer having a touch screen, and the like. The wireless communication terminal 30 is provided with a wireless communication unit 31 and a route generating unit 32 that generates a target travel route. Based on various information input at the touch screen, the route generating unit 32 can generate the target travel route for autonomous driving of the tractor 1. The route generating unit 32 is composed of a CPU (Central Processing Unit), for example, owned by the personal computer.

The wireless communication terminal 30 sends various information to the tractor 1 for autonomous driving of the tractor 1, such as the target travel route. The control unit 23 of the tractor 1 seeks the current position information of the tractor 1 from the receiving signal of the GNSS antenna 26, seeks the displacement information and orientation information of the vehicle body 2 from the detected value at the inertial measurement unit 25, and controls the transmission unit 22, the steering unit 24 and the like based on the above pieces of information. This allows the tractor 1 to travel autonomously along the target travel route generated by the route generating unit 32.

[2. Configuration of Installing Antenna Unit]

Figure 3:
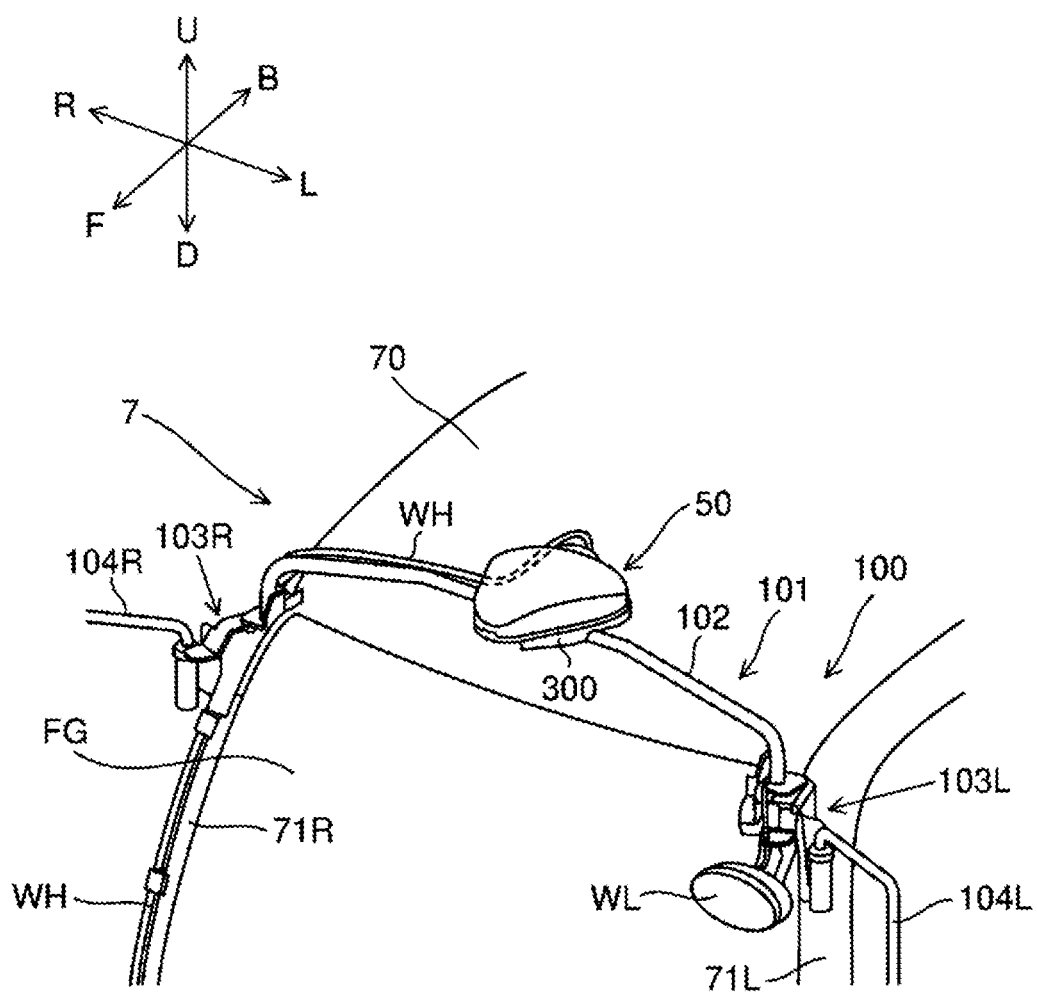
FIG. 3 is a perspective view from above a cabin.

Next, the configuration for installing the above antenna unit 50 to the tractor 1 will be described. FIG. 3 is a perspective view from above the cabin 7 of the tractor 1. The tractor 1 is equipped with a support configuration portion 100. The support configuration portion 100 is installed on the vehicle body 2.

(2-1. Support Configuration Portion)

The support configuration portion 100 includes the above cabin 7 provided at the vehicle body 2, and a support portion 101 installed on the cabin 7.

The cabin 7 includes a roof 70 and a plurality of pillars. The roof 70 is located above the driver's seat 9 (see FIG. 1). The plurality of pillars each is a leg that supports the roof 70 on the vehicle body 2. The plurality of pillars includes pillars supporting at least four edges of the roof 70. FIG. 3 illustrates, among the plurality of pillars, a right front pillar 71R which supports the right edge of the roof 70, and a left front pillar 71L which supports the left edge of the roof 70.

The support portion 101 includes a support pipe 102, a right stay 103R, and a left stay 103L. The support pipe 102 extends in the left-right direction and is bent downward at both ends thereof. The right stay 103R is fixed to the right front pillar 71R of the cabin 7 by bolts or the like. The left stay 103L is fixed to the left front pillar 71L of the cabin 7 by bolts or the like. The right and left ends of the support pipe 102 are fixed to the right stay 103R and the left stay 103L, respectively, by bolts or the like. This fixes the support pipe 102 to the right front pillar 71R and the left front pillar 71L via the right stay 103R and the left stay 103L. That is, the support portion 101 is installed on the cabin 7.

The right stay 103R supports a rear view mirror (not illustrated) via a right mirror support rod 104R. The left stay 103L supports a work lamp WL and also supports the rear view mirror (not illustrated) via a left mirror support rod 104L. The right stay 103R may support a work lamp in the same manner as the left stay 103L.

Figure 4:
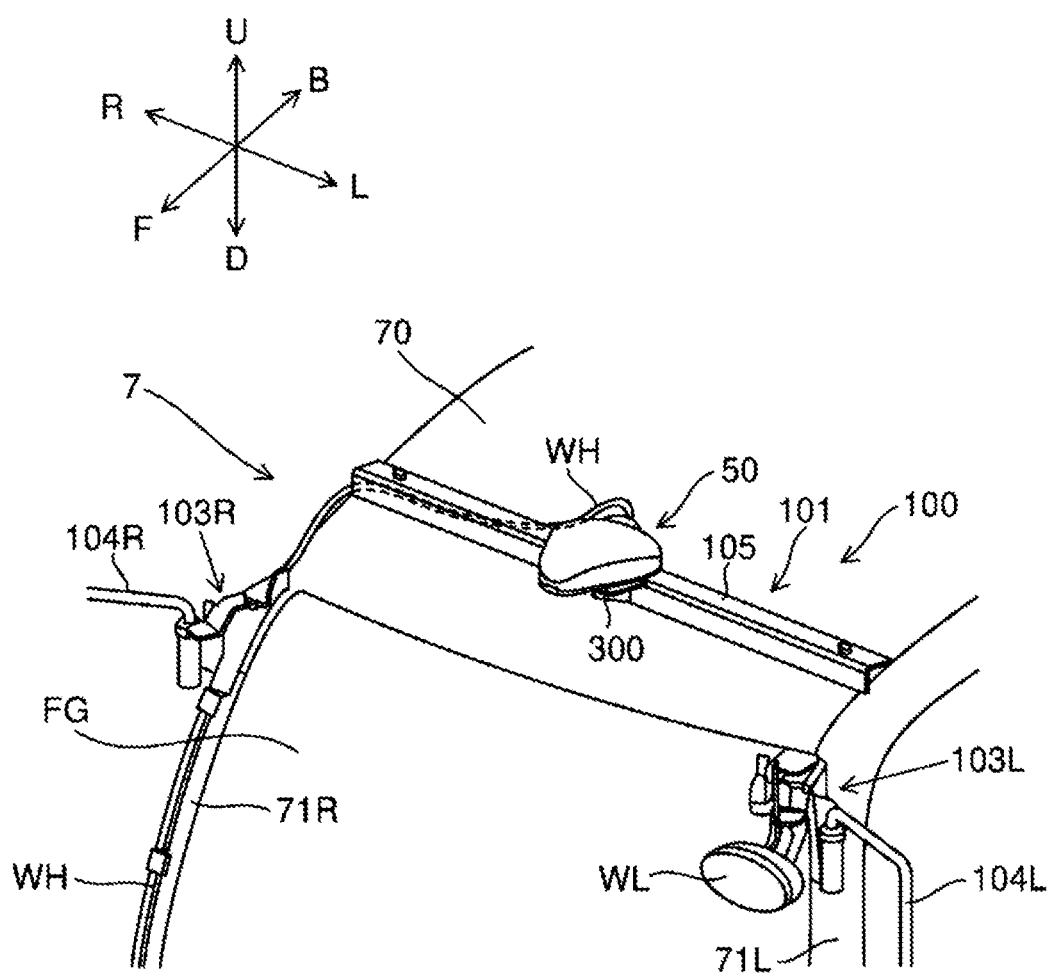
FIG. 4 is a perspective view showing a configuration of a support portion.

FIG. 4 is a perspective view showing another configuration of the support portion 101. The support portion 101 may include a support stay 105. The support stay 105 is formed long in the left-right direction and is directly fixed to the roof 70 of the cabin 7 by bolts or the like. This installs the support portion 101 to the cabin 7.

(2-2. Installing Stay)

Figure 5:
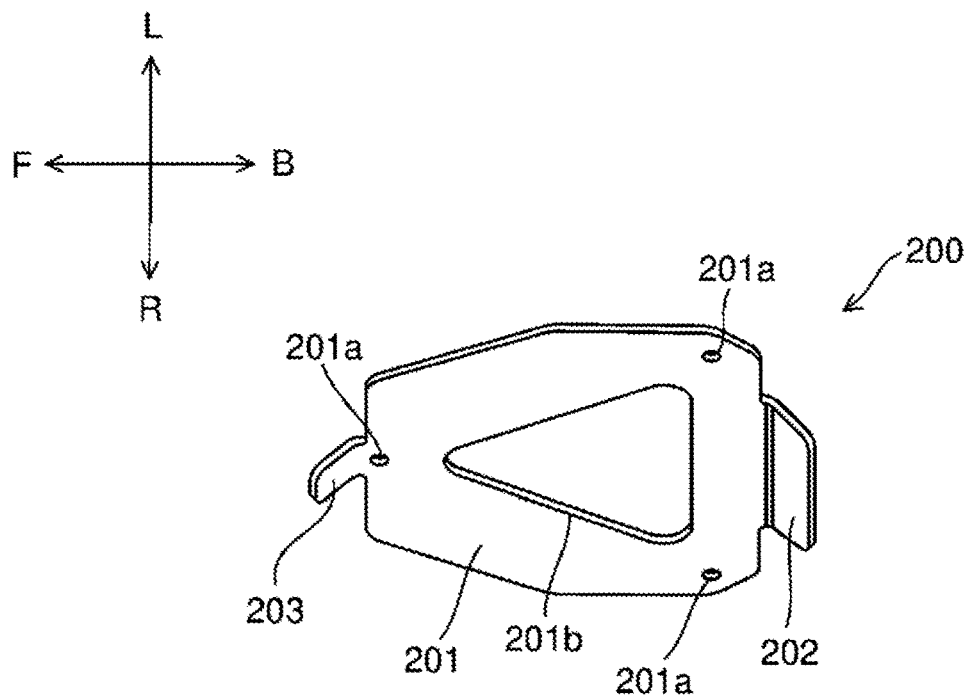
FIG. 5 is a perspective view from below an installing stay, seen before an antenna unit is installed.
Figure 6:
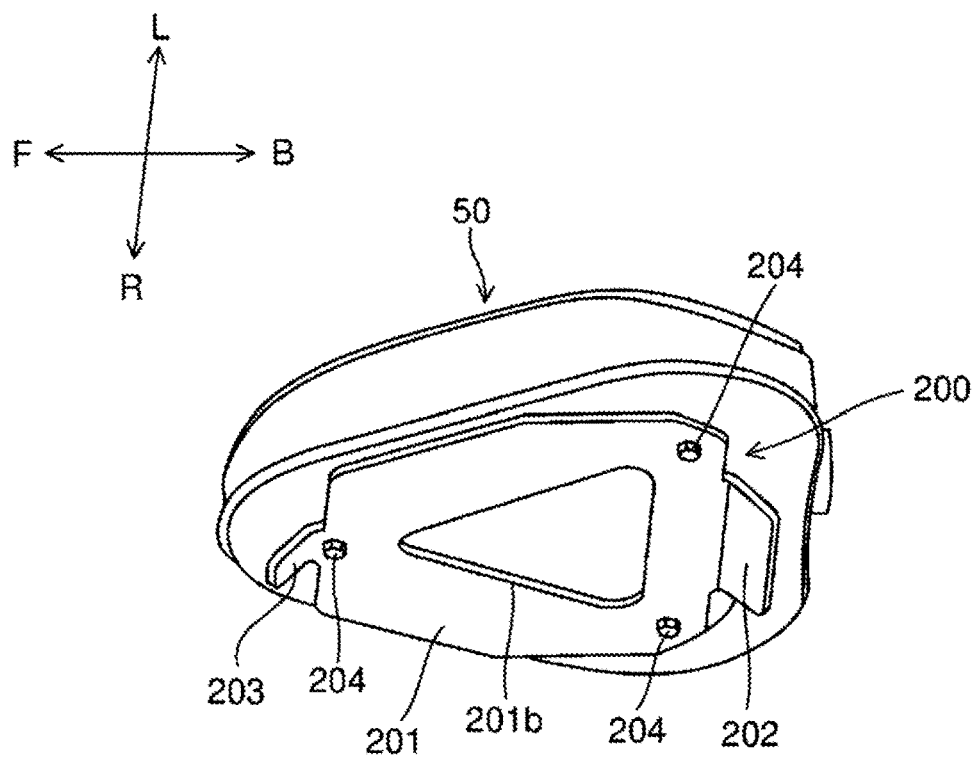
FIG. 6 is a perspective view from below the installing stay, seen after the antenna unit is installed.

FIGS. 5 and 6 are each a perspective view from below the installing stay 200. The tractor 1 is equipped with the installing stay 200. The antenna unit 50 is fixed to the installing stay 200. FIG. 5 shows the installing stay 200 seen before the antenna unit 50 is installed, and FIG. 6 the installing stay 200 seen after the antenna unit 50 is installed. The installing stay 200 has a main body portion 201, a first protruding piece portion 202, and a second protruding piece portion 203.

The main body portion 201 is composed of a flat metal plate, for example, and has a through hole 201a passing through in the thickness direction (e.g., up and down). That is, the installing stay 200 has the through hole 201a. In FIG. 5, in the main body portion 201, the through holes 201a are provided at two locations on the left and right in the rear portion, and one location in the center in the front portion, three locations in total; the number of through holes 201a may be, however, one, two, four or more.

The antenna unit 50 is positioned on the installing stay 200, and a bolt 204 (fastening member) shown in FIG. 6 is inserted from below into the through hole 201a of the installing stay 200. Then, the bolt 204 is screwed to a nut provided on a housing side of the antenna unit 50. This fixes the bolt 204 and the antenna unit 50, fixing the antenna unit 50 to installing stay the installing stay 200. The above screwing means that the bolt is turned to join with the nut. Thus, the installing stay 200 has the main body portion 201 to which the antenna unit 50 is installed.

The tractor 1 in the present embodiment can also be said to be equipped with a fastening member (e.g., bolt 204) that fastens the antenna unit 50 to the installing stay 200. The bolt 204 is inserted into the through hole 201a thereby to be fixed to the antenna unit 50.

In the center of the main body portion 201 of the installing stay 200, a substantially triangular-shaped hole 201b is formed for lightening the installing stay 200, but the hole 201b may be omitted.

The first protruding piece portion 202 is connected to the rear portion of the main body portion 201 and slopes rearward and diagonally downward (at an acute angle). That is, the first protruding piece portion 202 is connected to the main body portion 201 at an inclination relative to the vertical direction which is the direction of gravity. In the present embodiment, the first protruding piece portion 202's inclination angle relative to the direction of gravity is, for example, 45°, but not limited to this angle, and can be appropriately set within the range of an angle greater than 0° and smaller than 90°, for example.

The second protruding piece portion 203 is connected to the front portion of the main body portion 201 and slopes forward and diagonally downward (at an acute angle). That is, the installing stay 200 has the second protruding piece portion 203 that is connected to the main body portion 201 on the opposite side of the side connected to the first protruding piece portion 202. In the present embodiment, the second protruding piece portion 203's inclination angle relative to the direction of gravity is, for example, 45° but is not limited to this angle, and can be appropriately set within the range of an angle greater than 0° and smaller than 90°, for example.

(2-3. Base Stay)

Figure 7:
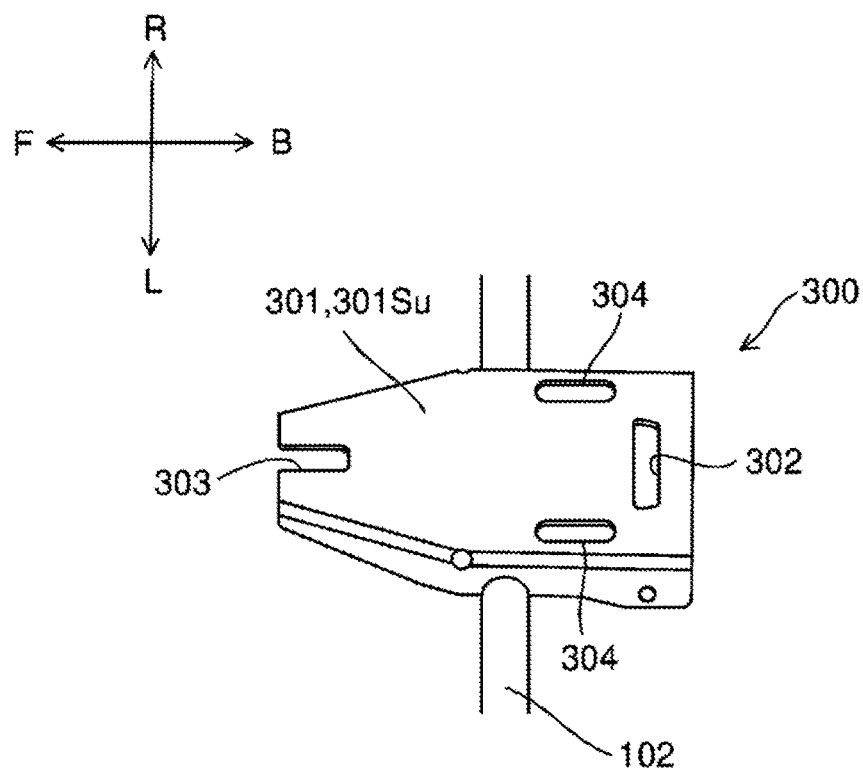
FIG. 7 is a perspective view from above a base stay.

FIG. 7 is a perspective view from above the base stay 300. The tractor 1 is equipped with the base stay 300. The base stay 300 is fixed to the support pipe 102 by welding or the like. That is, the base stay 300 is fixed to the support configuration portion 100. Thus, the base stay 300 is installed on the vehicle body 2 via the support configuration portion 100.

The base stay 300 has a base portion 301. The base portion 301 is formed by bending downward near the left and right edges of a flat metal plate, for example. The base portion 301 is in contact with the support pipe 102 at the left and right edge portions which are bent downward. The base portion 301 is substantially pentagonal in shape, viewed from above, but is not limited to this shape.

The above base portion 301 has a hole portion 302 that passes through in the vertical direction. That is, the hole portion 302 is located on the base stay 300 (base portion 301), passing through an upper surface 301Su and a lower surface 301Sd (see FIG. 9). The hole portion 302 is located in the rear portion of the base stay 300. The hole portion 302 is formed in a shape that is long in the left and right directions, and is also formed in such a shape that allows inserting of the first protruding piece portion 202 of the installing stay 200 (see FIG. 5, etc.).

The base portion 301 further has an opening portion 303. The opening portion 303 is formed in a shape that the second protruding piece portion 203 of the installing stay 200 enters. That is, the base stay 300 has the opening portion 303 into which the second protruding piece portion 203 enters. In the present embodiment, the opening portion 303 is located in the front portion of the base stay 300. And, the opening portion 303 is formed by a notch with a front opening. The opening portion 303 may be a hole passing through in the vertical direction.

The base portion 301 further has a receiving portion 304. The receiving portion 304, viewed from above, is provided in a position overlapping the through hole 201a (see FIG. 5) of the installing stay 200 when the first protruding piece portion 202 of the installing stay 200 is inserted into the hole portion 302 of the base stay 300, thereby fixing the installing stay 200 to the base stay 300. Then, the receiving portion 304 receives a portion (for example, head portion 204a (see FIG. 9)) of the bolt 204 (see FIG. 6) that protrudes from the through hole 201a to the base stay 300 side. That is, the base stay 300 has the receiving portion 304 that receives a portion of a tightening member protruding from the through hole 201a to the base stay 300 side.

The above receiving portions 304 are provided at two locations on the left and right of the base portion 301, corresponding to the positions of the two through holes 201a on the left and right in the rear portion of the installing stay 200. Each of receiving portions 304 is formed by a hole that passes through the base portion 301 in the vertical direction, but may also be formed by a recess portion that is closed at the bottom. In particular, in the present embodiment, the receiving portion 304 is formed by a long hole that is long in the front-back direction of the base stay 300. The hole portion 302 and the opening portion 303 are arranged in line with the front-back direction of the base stay 300. The hole portion 302 is located on the rear side of the base stay 300, and the opening portion 303 is located on the front side of the base stay 300, respectively.

The opening portion 303 is formed in the position that corresponds to the through hole 201a at the one location in the front portion of the installing stay 200. Therefore, not only the second protruding piece portion 203 of the installing stay 200, a portion of the bolt 204 inserted into the through hole 201a also enters into the opening portion 303. That is, the opening portion 303 doubles as a receiving portion for a portion of the bolt 204.

[3. How to Install Antenna Unit]

Next, the procedure for installing the antenna unit on the tractor 1 is described. Note that here, the antenna unit 50 is already fixed to the installing stay 200 by means of the bolt 204. The base stay 300 is fixed to the support pipe 102, and the support pipe 102 is fixed to the right front pillar 71R and the left front pillar 71L via the right stay 103R and the left stay 103L. Even when the base stay 300 is fixed to the support stay 105 (see FIG. 4), the following method is applied thereby to install the installing stay 200 to the base stay 300.

Figure 8:
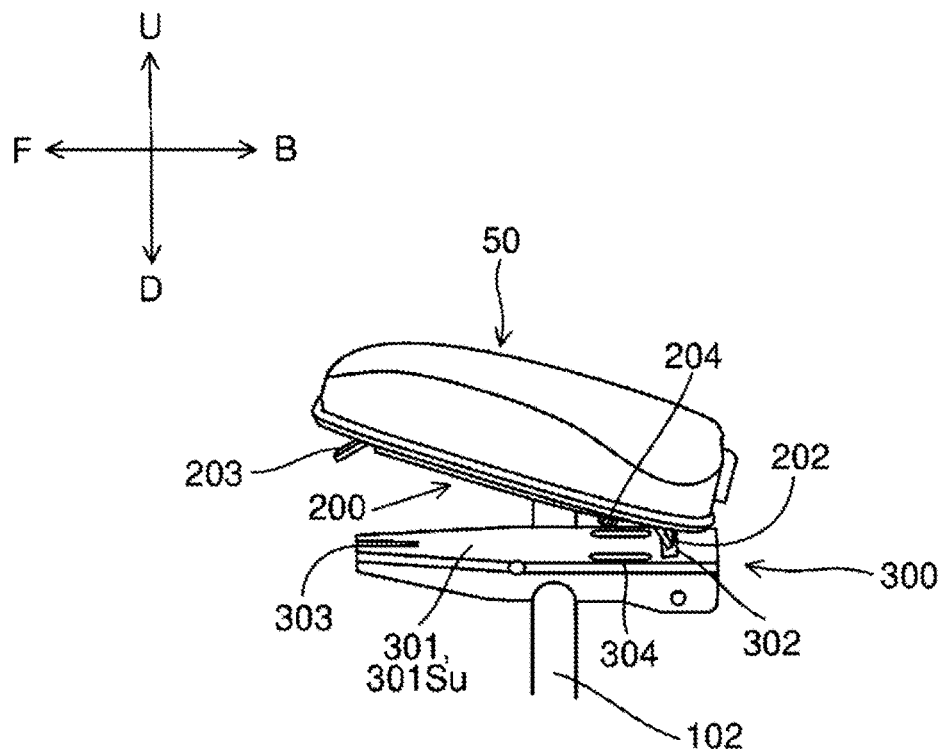
FIG. 8 is a perspective view schematically showing one process of fixing, to the base stay, the installing stay to which the antenna unit is fixed.

FIG. 8 is a perspective view schematically showing one process of fixing, to the base stay 300, the installing stay 200 to which the antenna unit 50 is fixed. First, a user (e.g., driver), while gripping the installing stay 200, lowers the rear portion of the installing stay 200, thereby to insert the first protruding piece portion 202 of the installing stay 200 into the hole portion 302 of the base stay 300. Then, with the first protruding piece portion 202 inserted into the hole portion 302, the installing stay 200 is lowered. This allows the second protruding piece portion 203 of the installing stay 200 to enter into the opening portion 303 of the base stay 300. In this state, the user's gripping of the installing stay 200 is cancelled.

Figure 9:
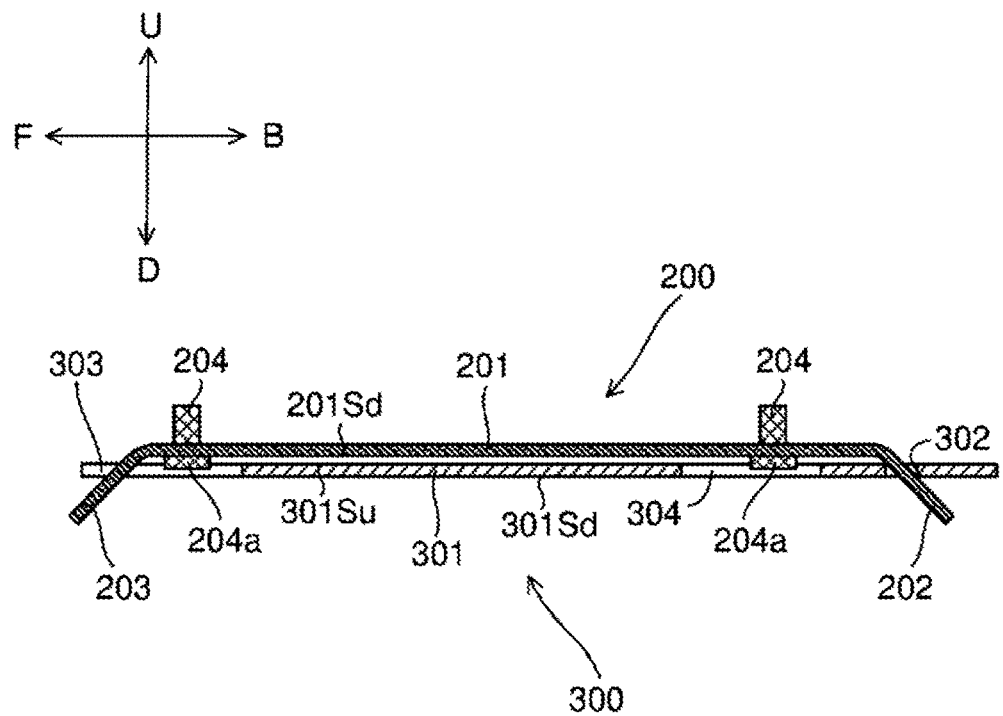
FIG. 9 is a cross-sectional view of the installing stay and the base stay in a state where gripping of the installing stay is cancelled.

FIG. 9 is a cross-sectional view of the installing stay 200 and the base stay 300 in a state where gripping of the installing stay 200 is cancelled. As described above, the first protruding piece portion 202 is connected to the rear portion of the main body portion 201 in a manner to be inclined relative to the vertical direction. Therefore, with the second protruding piece portion 203 entering into the opening portion 303, cancelling the gripping of the installing stay 200 allows the front portion of the installing stay 200 to attempt to further lower due to the dead weight of the installing stay 200; as a result, the first protruding piece portion 202 hooks on and engages with the edge of the hole portion 302. This fixes the installing stay 200 to the base stay 300. That is, the antenna unit 50 fixed to the installing stay 200 is fixed to the tractor 1.

Meanwhile, when the antenna unit 50 is to be removed from the tractor 1, the front portion of the installing stay 200 is lifted. This detaches the second protruding piece portion 203 from the opening portion 303 and lowers the first protruding piece portion 202 in the rear portion of the installing stay 200. This cancels the engaging between the first protruding piece portion 202 and the hole portion 302. Then, moving the installing stay 200 upward thereby to pull the first protruding piece portion 202 out of the hole portion 302 cancels the fixing between the installing stay 200 and the base stay 300. That is, the antenna unit 50 fixed to the installing stay 200 is removed from the tractor 1.

Figure 10:
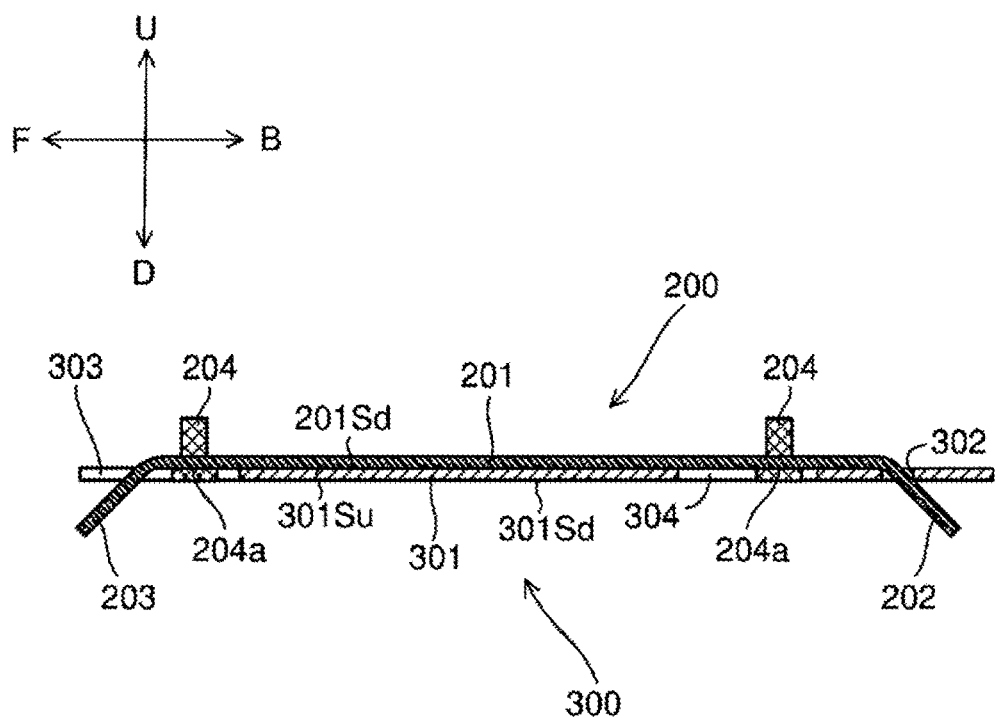
FIG. 10 is a cross-sectional view schematically showing another condition of fixing the installing stay and the base stay.

In FIG. 9, when the first protruding piece portion 202 is engaged at the hole portion 302, a lower surface 201Sd of the installing stay 200 (especially, the main body portion 201) and an upper surface 301Su of the base stay 300 (especially, the base portion 301) are spaced apart from each other, but the positional relation between the installing stay 200 and the base stay 300 at the time of the fixing is not limited to the state shown in FIG. 9. For example, FIG. 10 is a cross-sectional view schematically showing another condition of fixing the installing stay 200 and the base stay 300. As shown in FIG. 10, when the first protruding piece portion 202 is engaged at the hole portion 302, the lower surface 201Sd of the main body portion 201 of the installing stay 200 may be positioned in close contact with the upper surface 301Su of the base stay 300.

Figure 11:
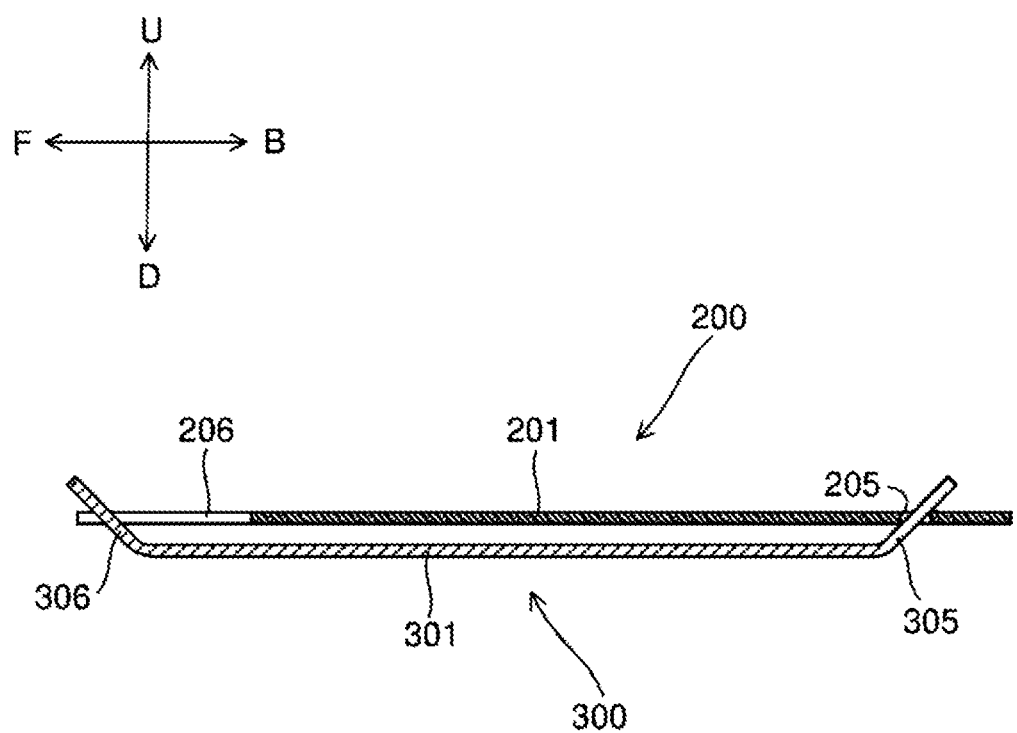
FIG. 11 is a cross-sectional view schematically showing another configuration of the installing stay and base stay.

FIG. 11 is a cross-sectional view schematically showing another configuration of the installing stay 200 and base stay 300. The configuration of the installing stay 200 and base stay 300 may be the reverse of that shown in FIG. 9, etc. A brief description of the configuration of FIG. 11 is as follows.

The base stay 300 has a first protruding piece portion 305 and a second protruding piece portion 306. The first protruding piece portion 305 is connected to the rear portion of the base portion 301, and is inclined rearward and diagonally upward (at an acute angle). The second protruding piece portion 306 is connected to the front portion of the base portion 301, and is inclined forward and diagonally upward (at an acute angle).

The installing stay 200 has a hole portion 205 and an opening portion 206. The hole portion 205 is located in the rear portion of the installing stay 200. The hole portion 205 is formed in a shape that is long in the left and right directions, and is also formed in such a shape that allows inserting of the first protruding piece portion 305 of the base stay 300. The opening portion 206 is formed in a shape that the second protruding piece portion 306 of the base stay 300 enters. The opening portion 206 is located in the front portion of the installing stay 200. Then, the opening portion 206 is formed by a notch with a front portion opening. The opening portion 206 may be a hole penetrating in the vertical direction.

Even with this configuration of the installing stay 200 and base stay 300, inserting the hole portion 206 of the installing stay 200 relative to the first protruding piece portion 305 of the base stay 300 can engage the hole portion 206 with the first protruding piece portion 305, using the dead weight of the installing stay 200. Also, lift up the front portion of the installing stay 200 thereby to relatively detach the opening portion 206 away from the second protruding piece portion 306 and disengaging the first protruding piece portion 305 from the hole portion 206 can cancel the fixing of the installing stay 200 and the base stay 300.

[4. Effect]

As described above, in the present embodiment, one of the installing stay 200 and the base stay 300 has the protruding piece portion (first protruding piece portion 202 or first protruding piece portion 305). The other of the installing stay 200 and the base stay 300 has the hole portion (hole portion 302 or hole portion 205) in and with which the above protruding piece portion is inserted and engaged.

For example, inserting the protruding piece portion (first protruding piece portion 202) of the installing stay 200 into the hole portion (hole portion 302) of the base stay 300 thereby to engage the protruding piece portion with the hole portion fixes the installing stay 200 to the base stay 300. The antenna unit 50 is fixed to the installing stay 200. Meanwhile, the base stay 300 is fixed to the vehicle body 2 via the support configuration portion 100; therefore, fixing the installing stay 200 to the base stay 300 installs the antenna unit 50 on the tractor 1. Cancelling the engaging of the protruding piece portion to the hole portion thereby to pull the protruding piece portion out of the hole portion cancels the fixing of the installing stay 200 to the base stay 300. That is, the antenna unit 50 fixed to the installing stay 200 is removed from the tractor 1.

Thus, inserting and removing the protruding piece portion to and from the hole portion can attach and detach the antenna unit 50 to and from the tractor 1. This can easily attach and detach the antenna unit 50 to and from the tractor 1 without the use of a tool (no tool).

In the configuration shown in FIGS. 5 to 10, the installing stay 200 has the protruding piece portion (first protruding piece portion 202) and the base stay 300 has the hole portion (hole portion 302). In this configuration, inserting and removing the first protruding piece portion 202 of the installing stay 200 to and from the hole portion 302 of the base stay 300 can easily attach and detach the antenna unit 50 to and from the tractor 1.

The protruding piece portion (first protruding piece portion 202) is, due to the dead weight of the installing stay 200, engaged with the hole portion (hole portion 302). In this case, the first protruding piece portion 202 can be easily engaged with and fixed to the hole portion 302 without the use of any dedicated member to fix the first protruding piece portion 202 to the hole portion 302. In addition, the dead weight of the installing stay 200 stabilizes the engaging of the first protruding piece portion 202 to the hole portion 302. This also suppress the installing stay 200's rattling relative to the base stay 300.

The protruding piece portion (first protruding piece portion 202) of the installing stay 200 is connected to the main body portion 201, and is inclined relative to the vertical direction. The hole portion (hole portion 302) in the base stay 300 is located through the upper and lower surfaces of the base stay 300. In this configuration; when the user grips the installing stay 200 and inserts the first protruding piece portion 202 into the hole portion 302 of the base stay 300 from above and cancels the gripping, the first protruding piece portion 202 is hooks on and is engaged with the hole portion 302 despite the installing stay 200 being inclined to fall due to the dead weight. That is, using the dead weight of the installing stay 200 can securely engage the first protruding piece portion 202 with the hole portion 302.

In the configuration shown in FIG. 10, the first protruding piece portion 202, when engaged with the hole portion 302 causes the lower surface 201Sd of the installing stay 200 in close contact with the upper surface 301Su of the base stay 300. In this case, the surface contact between the lower surface 201Sd and the upper surface 301Su can stabilize the fixing of the installing stay 200 to the base stay 300.

In addition to the first protruding piece portion 202 as the protruding piece portion, the installing stay 200 has the second protruding piece portion 203. Then, the base stay 300 has the opening portion 303. The second protruding piece portion 203 of the installing stay 200, by entering into the opening portion 303 of the base stay 300, can position the second protruding piece portion 203 relative to the base stay 300. This can suppress misalignment that is caused when fixing the installing stay 200 to the base stay 300.

In particular, in the present embodiment, the opening portion 303 is the notch. In this configuration, the second protruding piece portion 203 can be easily inserted into the opening portion 303 in a manner to cross the notched portion of opening portion 303. For example, as shown in FIG. 7 and FIG. 8, when the front portion of the base stay 300 is notched thereby to form the opening portion 303, inserting the first protruding piece portion 202 into the hole portion 302, followed by lowering the front portion of the installing stay 200 (by rotating the installing stay 200) can easily insert the second protruding piece portion 203 into the opening portion 303 from the front. This makes it easy to position the installing stay 200 relative to the base stay 300.

In the present embodiment, the base stay 300 has the receiving portion 304 that receives a portion of the bolt 204 as a fastening member. In this configuration, even when a portion (e.g., head portion 204a) of the bolt 204 that is fixed to the antenna unit 50 (see FIG. 6 and FIG. 8) protrudes from the installing stay 200 to the base stay 300 side as shown in FIGS. 9 and 10, the protruding head portion 204a enters into the receiving portion 304 of the base stay 300. This prevents the head portion 204a from interfering with the base stay 300. If the above interference should occur, the first protruding piece portion 202 does not contact the edge of the hole portion 302, causing a risk of preventing the first protruding piece portion 202 from engaging with the hole portion 302. Entering the head portion 204a into the receiving portion 304 thereby to prevent the interference can reduce the risk of the interference preventing the engaging.

Also, when the first protruding piece portion 202 is engaged at the hole portion 302; a portion (e.g., the head portion 204a) of the bolt 204 protruding from the installing stay 200 enters into the receiving portion 304, thereby making it possible to cause the surface contact between the lower surface 201Sd and the upper surface 301Su, as shown in FIG. 10. This ensures the above effect of stabilizing the fixing of the installing stay 200 to the base stay 300.

As shown in FIG. 7, the receiving portion 304 is formed by a hole that is long in the front-back direction. In this case, as shown in FIG. 8, while inserting the first protruding piece portion 202 of the installing stay 200 into the hole portion 302, turning the second protruding piece portion 203 in a direction for approaching the base stay 300 (lowering the front portion of the base stay 300) moves, from the front to the rear, a portion (e.g., the head portion 204a) of the bolt 204 which protrudes from the installing stay 200 side to the base stay 300 side, and enters into the receiving portion 304. As a result, while preventing the interference between the base stay 300 and the bolt 204, smoothly turning the installing stay 200 relative to the base stay 300 can engage the first protruding piece portion 202 with the hole portion 302.

As shown in FIG. 3 and FIG. 4, the support configuration portion 100 includes the cabin 7 installed on the vehicle body 2, and the support portion 101 that is installed on the pillars (front right pillar 71R, front left pillar 71L) or roof 70 of the cabin 7. In this configuration, the antenna unit 50 can be easily attached and detached to and from the tractor 1 (e.g., above the roof 70) having the cabin 7. As shown in FIG. 3, the support portion 101 may include the right stay 103R, the left stay 103L and the support pipe 102. The support portion 101 may also include the support stay 105 that is directly installed on the roof 70, as shown in FIG. 4.

[5. Fixing Member]

Figure 12:
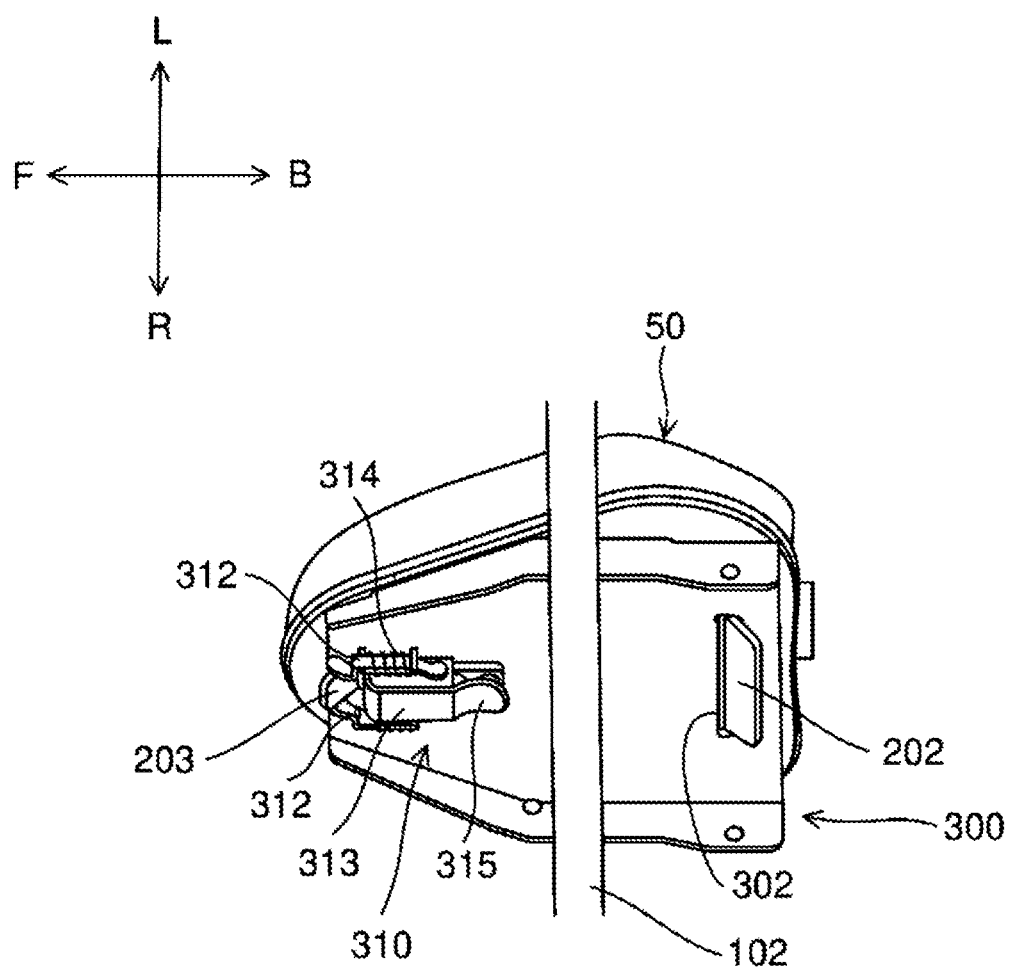
FIG. 12 is a perspective view from below, showing another configuration of the base stay.
Figure 13:
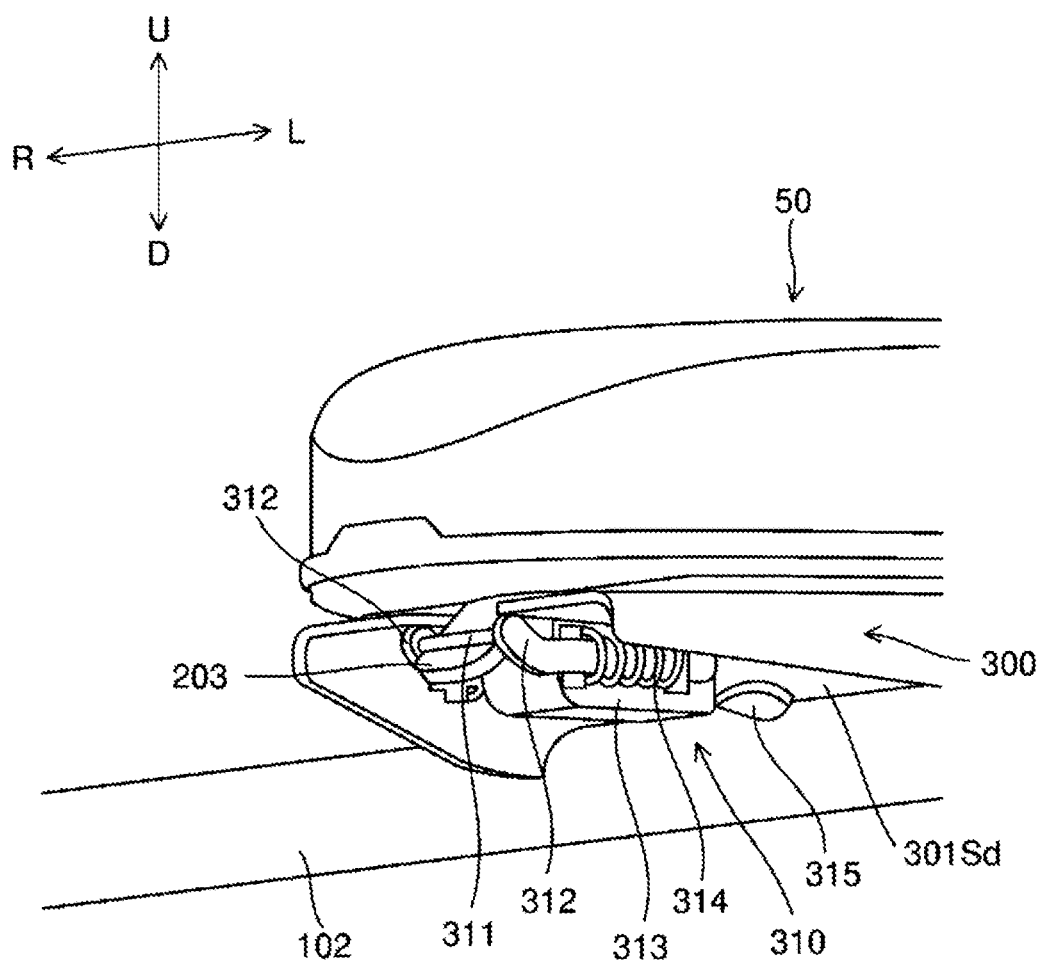
FIG. 13 is a perspective view of a fixing member viewed from diagonally below.

FIG. 12 is a perspective view from below, showing another configuration of the base stay 300. The base stay 300 may be provided with a fixing member 310. The fixing member 310 hooks the second protruding piece portion 203 of the installing stay 200, thereby to fix the installing stay 200 to the base stay 300. The above fixing member 310 includes, for example, a draw latch. Details of the fixing member 310 are described below based on FIG. 12 and FIG. 13. FIG. 13 is a perspective view of the fixing member 310 viewed from diagonally below. The following configuration of the fixing member 310 is an exemplification. Therefore, the fixing member 310 is not limited to the configurations in FIG. 12 and FIG. 13, and any other configuration is allowed.

The fixing member 310 has an engaging rod 311, a pair of left and right support members 312, 312, and a rotational member 313. The engaging rod 311 includes a small diameter rod or hollow pipe that is long in the left and right directions.

Each support member 312 supports the engaging rod 311. That is, one support member 312 is located on the right side of the engaging rod 311, and supports the right end of the engaging rod 311. The other support member 312 is located on the left side of the engaging rod 311, and supports the left end of the engaging rod 311. The support members 312 are positioned opposite each other in the left-right direction, and sandwich the engaging rod 311 from the left-right direction.

Each of the support members 312 includes two arm members (not shown) located side by side in the left and right directions. The two arm members are each long and can slide relative to each other. Around the two arm members, there is located a biasing member 314 such as a spring. The biasing member 314 is extendable and contractable in the longitudinal direction of the two arm members, one end of which is connected to the one arm member and the other end of which is connected to the other arm member. In this configuration, the one arm member, when moving to one side of the longitudinal direction, extends or contracts the biasing member 314 in conjunction the above moving. A reaction force (counteraction) of the extending or contracting of the biasing member 314 causes the other arm member to move in the same direction (to one side in the longitudinal direction) as the one arm member. Therefore, with the entire support member 312 caused to have elasticity (flexibility) in the long direction due to the biasing member 314, the two arm members can be moved in the same direction.

The rotational member 313 rotates around a fixed shaft P (see FIG. 14) that extends in the left-right direction. The rotational member 313 has a hole 313a (see FIG. 14) penetrating in the left-right direction, and the fixed shaft P is inserted into the hole 313a. This allows the rotational member 313 to rotate around the fixed shaft P. The fixed shaft P is fixed via a connecting member (not shown) to the lower surface 301Sd of the base stay 300.

In the rotational member 313, a grip portion 315 is connected to the end opposite to the side where the hole 313a is formed. Thus, the user, by gripping the grip portion 315, can manually rotate the rotational member 313.

A shaft portion 313b extending in the left-right direction is rotatably inserted in the rotational member 313. To the shaft portion 313b, each support member 312's end portion opposite to the side for supporting the engaging rod 311 is rotatably connected.

Figure 14:
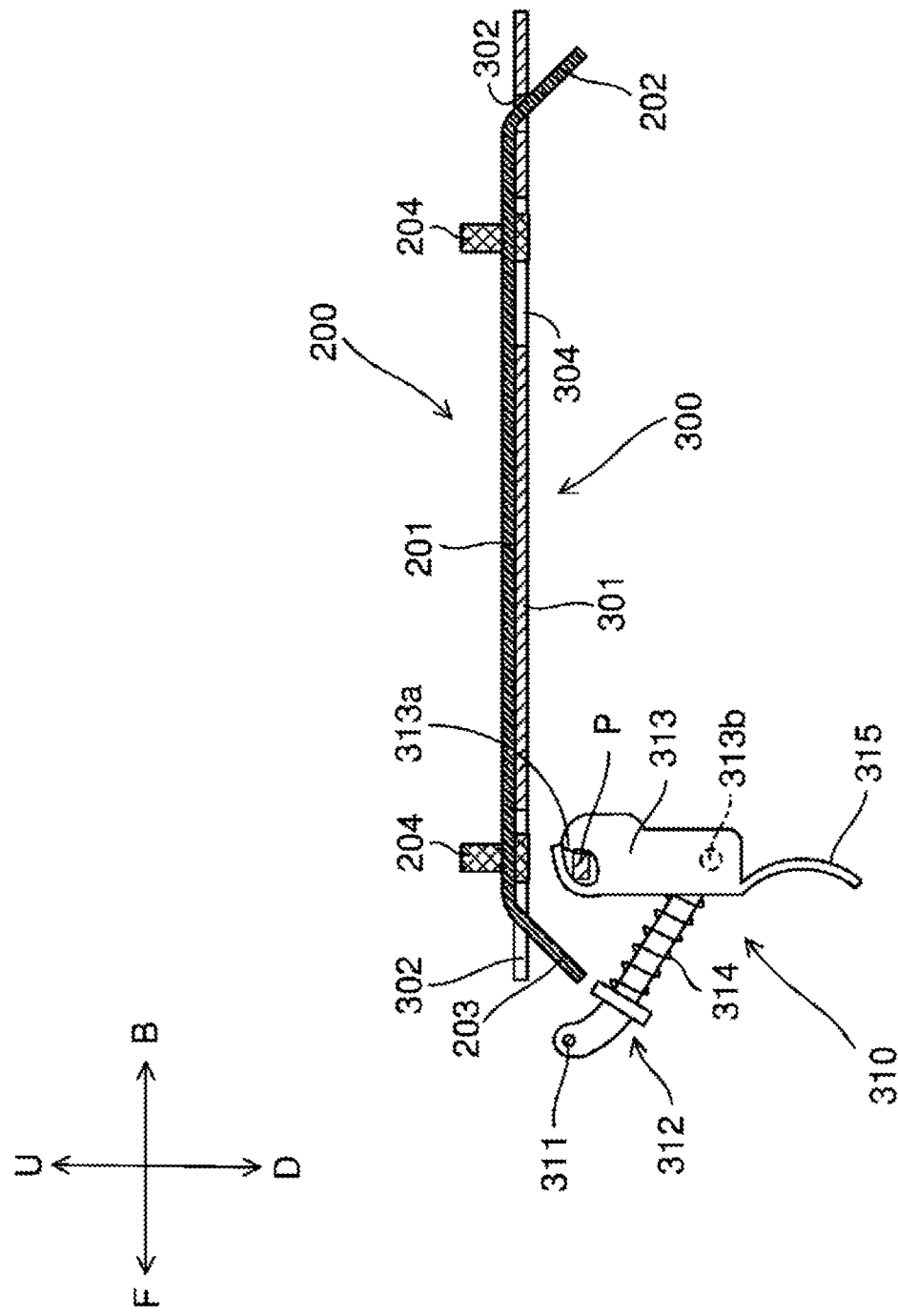
FIG. 14 is a cross-sectional view showing a state seen before a second protruding piece portion of the installing stay is fixed by the fixing member.
Figure 15:
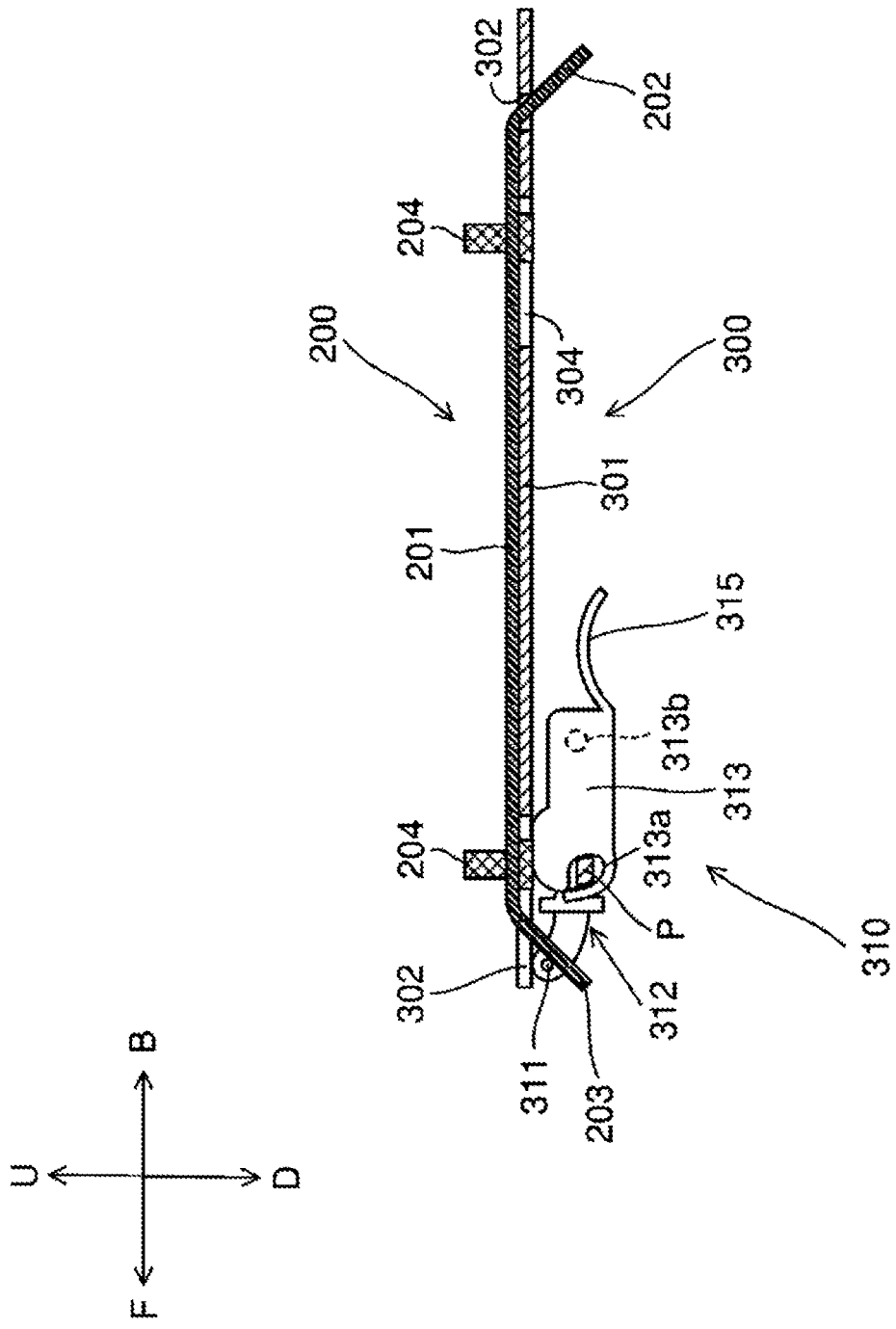
FIG. 15 is a cross-sectional view showing the state seen after the second protruding piece portion is fixed by the fixing member.

FIG. 14 is a cross-sectional view showing a state seen before the second protruding piece portion 203 of the installing stay 200 is fixed by the fixing member 310. FIG. 15 is a cross-sectional view showing the state seen after the second protruding piece portion 203 is fixed by the fixing member 310. In the position of the fixing member 310 shown in FIG. 14, the engaging rod 311 of the fixing member 310 can be hooked to the second protruding piece portion 203 of the installing stay 200.

After hooking the engaging rod 311 to the second protruding piece portion 203, the user grips and rearwardly rotates the grip portion 315 of the fixing member 310. Then, around the fixed shaft P, the rotational member 313 turns counterclockwise in FIG. 14. In the rearward direction, this rotation pulls each support member 312 connected via the shaft portion 313b to the rotational member 313. As a result; in the rearward direction, the engaging rod 311 supported by each support member 312 pulls the second protruding piece portion 203.

Then, as shown in FIG. 15, with the rotational member 313 rotated 90° about the fixed shaft P from the state of FIG. 14, pulling the second protruding piece portion 203 rearward by the engaging rod 311 ends. This allows the second protruding piece portion 203 to be engaged and fixed by the fixing member 310 (especially the engaging rod 311).

In this way, the base stay 300 is provided with the fixing member 310 that hooks and fixes the second protruding piece portion 203 of the installing stay 200. When the installing stay 200 is fixed to the base stay 300, not only the first protruding piece portion 202 is engaged to the hole portion 302 as described above, but also the second protruding piece portion 203 is fixed by the fixing member 310. This further stabilizes the fixing of the installing stay 200 to the base stay 300. In addition, the two fixing portions including the first protruding piece portion 202 and the second protruding piece portion 203 can securely fix the installing stay 200 to the base stay 300. This can securely prevent the case where the installing stay 200 is easily removed from the base stay 300 due to vibration, etc. during the traveling of the tractor 1.

[6. Another Configuration of Tractor]

Figure 16:
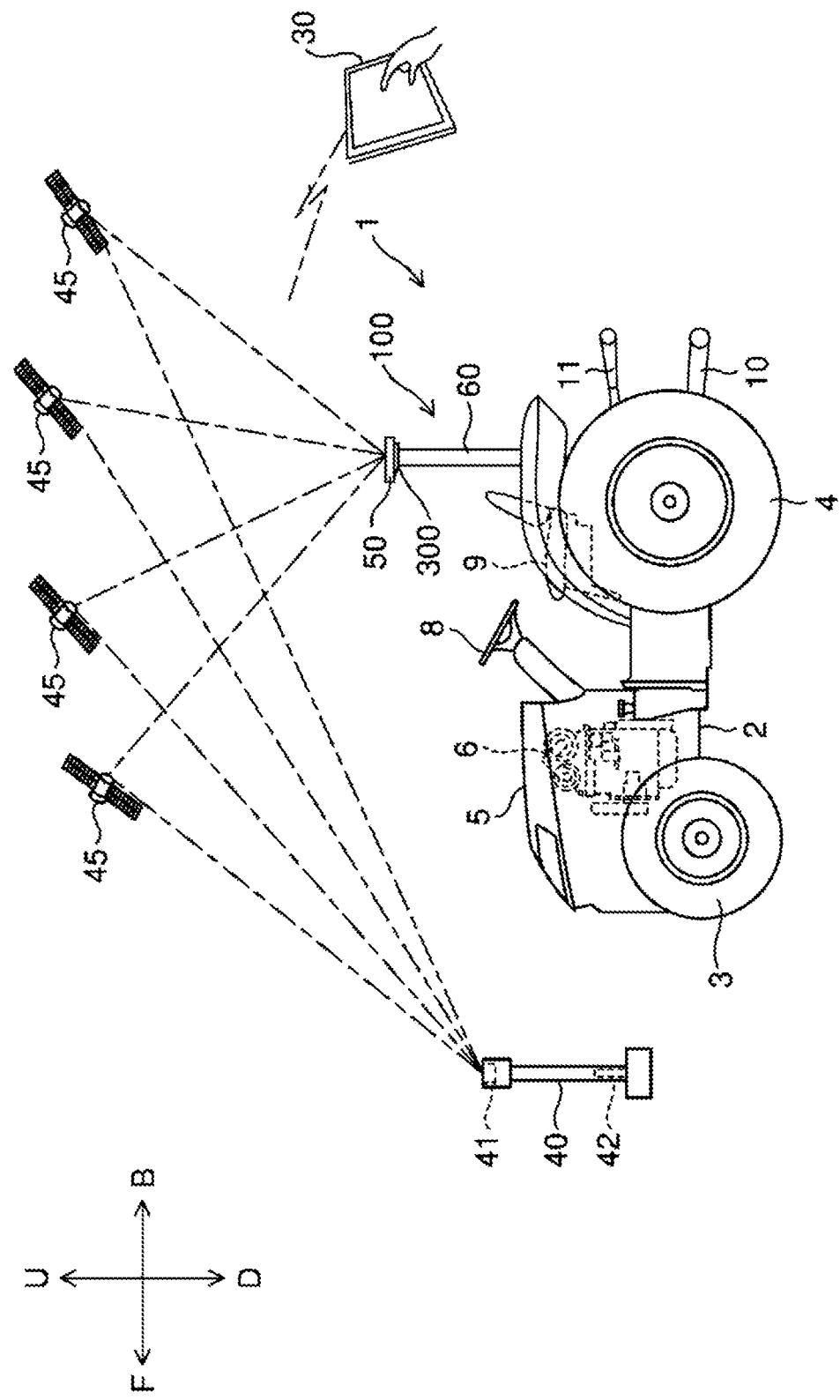
FIG. 16 is a side view showing another configuration of the tractor.

FIG. 16 is a side view showing another configuration of the tractor 1. As shown in FIG. 16, the tractor 1 may be configured with a roll-over protection structure frame 60 (hereinafter, ROPS frame 60). The ROPS frame 60 is a safety frame (guard) provided for the purpose of protecting the driver in the event of a falling of the tractor 1 of a type without the roof 70 and pillar supporting the roof 70 as described above. The ROPS frame 60 includes a hollow frame, for example. The ROPS frame 60 is erected in an inverted U-shape behind the driver's seat 9 in the vehicle body 2. In this case, the support configuration portion 100 installed on the vehicle body 2 may include the ROPS frame 60.

In this case, as shown in FIG. 16, with the base stay 300 fixed to the uppermost portion of the ROPS frame 60, the installing stay 200 to which the antenna unit 50 is fixed can be attached and detached to and from the base stay 300 in the same manner as above. Thus, the antenna unit 50 can be easily attached and detached to and from the tractor 1 that does not have the roof 70 and the pillar.

The embodiment of the present invention has been described above, but the scope of the present invention is not limited thereto and can be carried out within an extended or modified range without departing from the gist of the present invention.

INDUSTRIAL APPLICABILITY

The present invention can be used for a work vehicle such as tractor, for example.

REFERENCE SIGNS LIST 1 tractor (work vehicle)
2 vehicle body
7 cabin
45 positioning satellite
70 roof
71R right front pillar
71L left front pillar
45 positioning satellite
50 antenna unit (positioning unit)
60 roll-over protection structure frame
100 support configuration portion
101 support portion
200 installing stay
201 main body portion
201a through hole
201Sd lower surface
202 first protruding piece portion (protruding piece portion)
203 second protruding piece portion
204 bolt (fastening member)
300 base stay
301Su upper surface
301Sd lower surface
302 hole portion
303 opening portion
304 receiving portion
310 fixing member

The invention claimed is:

1. A work vehicle provided with a vehicle body and a positioning unit configured to detect a position of the vehicle body based on a signal sent from a positioning satellite, the work vehicle comprising:
 a support configuration portion installed on the vehicle body;
 an installing stay to which the positioning unit is fixed; and
 a base stay fixed to the support configuration portion, wherein
  one of the installing stay and the base stay has a protruding piece portion, and another of the installing stay and the base stay has a hole portion into and with which the protruding piece portion is inserted and engaged.

2. The work vehicle according to claim 1, wherein the installing stay has the protruding piece portion, and the base stay has the hole portion.

3. The work vehicle according to claim 2, wherein the protruding piece portion is fixed to the hole portion by a dead weight of the installing stay.

4. The work vehicle according to claim 3, wherein
 the installing stay further has a main body portion to which the positioning unit is installed,
 the protruding piece portion, inclined relative to a direction of gravity, is connected to the main body portion, and
 the hole portion is located passing through an upper surface and lower surface of the base stay.

5. The work vehicle according to claim 4, wherein when the protruding piece portion is engaged at the hole portion, a lower surface of the main body portion is located in close contact with the upper surface of the base stay.

6. The work vehicle according claim 4, wherein, with the protruding piece portion defined as a first protruding piece portion;
 the installing stay further has a second protruding piece portion,
 the second protruding piece portion is connected to the main body portion of the installing stay on a side opposite to a side connected with the first protruding piece portion, and
 the base stay has an opening portion into which the second protruding piece portion enters.

7. The work vehicle according to claim 6, wherein the opening portion is a notch.

8. The work vehicle according to claim 6, wherein the base stay is provided with a fixing member to hook and fix the second protruding piece portion.

9. The work vehicle according to claim 6, further comprising:
 a fastening member that fastens the positioning unit to the installing stay, wherein
 the installing stay has a through hole,
 the fastening member is inserted into the through hole of the installing stay to be fixed to the positioning unit, and
 the base stay has a receiving portion configured to receive a portion of the fastening member protruding from the through hole toward the base stay side.

10. The work vehicle according to claim 9, wherein
the hole portion is located in a rear portion of the base stay,
the opening portion is located in a front portion of the base stay, and
the receiving portion is a long hole that is long in a front-rear direction of the base stay.

11. The work vehicle according to claim 1, wherein the support configuration portion includes
a cabin provided on the vehicle body, and
a support portion installed on a pillar or roof of the cabin.

12. The work vehicle according to claim 1, wherein the support configuration portion includes a roll-over protection frame erected behind a driver's seat in the vehicle body.

* * * * *